(12) United States Patent
Domres et al.

(10) Patent No.: US 11,892,288 B2
(45) Date of Patent: Feb. 6, 2024

(54) TRANSMISSION, AND RELATED SYSTEMS AND METHODS

(71) Applicant: Agility Robotics, Inc., Tangent, OR (US)

(72) Inventors: Ryan Domres, Albany, OR (US); Andy Abate, Albany, OR (US); Dylan Thrush, Corvallis, OR (US)

(73) Assignee: Agility Robotics, Inc., Tangent, OR (US)

( * ) Notice: Subject to any disclaimer, the term of this patent is extended or adjusted under 35 U.S.C. 154(b) by 158 days.

(21) Appl. No.: 17/632,147

(22) PCT Filed: Aug. 10, 2020

(86) PCT No.: PCT/US2020/045611
§ 371 (c)(1),
(2) Date: Feb. 1, 2022

(87) PCT Pub. No.: WO2021/030263
PCT Pub. Date: Feb. 18, 2021

(65) Prior Publication Data
US 2022/0276039 A1 Sep. 1, 2022

Related U.S. Application Data

(60) Provisional application No. 62/886,745, filed on Aug. 14, 2019.

(51) Int. Cl.
*G01B 7/30* (2006.01)
*F16H 19/08* (2006.01)
(Continued)

(52) U.S. Cl.
CPC ............... *G01B 7/30* (2013.01); *F16H 19/08* (2013.01); *F16H 49/001* (2013.01); *G01D 5/14* (2013.01); *F16H 2049/003* (2013.01)

(58) Field of Classification Search
CPC ......... G01B 7/30; F16H 19/08; F16H 49/001; F16H 2049/003; G01D 5/14
See application file for complete search history.

(56) References Cited

U.S. PATENT DOCUMENTS 8,319,492 B2 11/2012 Schmidt et al.
10,557,707 B2 2/2020 Omata et al.
(Continued)

FOREIGN PATENT DOCUMENTS

JP 2019181623 A * 10/2019 ............ B25J 13/088

OTHER PUBLICATIONS

International Search Report for PCT/US20/45611, dated Dec. 14, 2020.

*Primary Examiner* — Terence Boes

(57) ABSTRACT

A transmission includes a housing having a first end and a second end opposite the first end, a carrier mounted to the housing, an input shaft, an output shaft, a passage that extends from the housings first end to the housings second end to allow a via through the housing, an input sensor, and an output sensor. The carrier has a first side that faces in a first direction, and a second side that faces in a direction other than the first direction. The input sensor is mounted to the carrier and disposed on the first side of the carrier. The output sensor is mounted to the same carrier and disposed on the carrier's second side. The input and output shafts rotate about the same axis.

15 Claims, 5 Drawing Sheets

(51) Int. Cl.
*F16H 49/00* (2006.01)
*G01D 5/14* (2006.01)

(56) References Cited

U.S. PATENT DOCUMENTS

2013/0257230 A1 10/2013 Schmidt et al.
2015/0142377 A1 5/2015 Kishida et al.
2019/0186604 A1 6/2019 Potter et al.
2021/0310834 A1* 10/2021 Coyne ..................... G01D 5/56

* cited by examiner

TRANSMISSION, AND RELATED SYSTEMS AND METHODS

BACKGROUND

There are many devices that use a transmission to control the application of power generated by a motor. A car, for example, uses a transmission to convert the power of the car's motor into motion that provides the car's wheels a desired torque and speed to propel the car in a variety of different situations. For another example, a robot may use a transmission in an actuator to amplify the torque of a motor while reducing its speed for connection to an end-effector. For robots, it is often important to also know the position and/or location of an end-effector of the robot so that one can appropriately direct the actuator to hold the end-effector in a position and/or at a desired location, or to apply a desired force.

To determine an actuator's position, control circuitry of the actuator typically includes a sensor on the output (slow side) of the transmission. Actuators may also include a sensor to sense the different positions of the transmission's input shaft as the actuator's motor moves it, along with another sensor to sense the different positions of the transmission's output shaft as the output shaft moves. Because the transmission's input shaft is often the output shaft of the actuator's motor, knowing the position of the input shaft while it moves allows the control circuitry to determine the speed at which the actuator motor's shaft moves as well as the position of the motor's rotor. Sensing the position of the transmission's output shaft as it moves allows the control circuitry to determine the velocity and position of the end-effector and appropriately modify the amount of power supplied to the actuator's motor to move or hold the end-effector as desired. Sensing the position of the transmission's input shaft allows for higher resolution in the measurement, as it moves many revolutions for each revolution of the output shaft; this permits more precise control of the end-effector, as well as fine control of the motor itself.

Most sensors used for these purposes include a target mounted to the shaft that moves, and an encoder mounted to a portion of the transmission that does not move, such as the housing. Typically, the encoder for the sensor on the input shaft is mounted at a location that is different than the location where the encoder for the output shaft is located, as those shafts are typically on opposite sides of the transmission.

Unfortunately, wiring and circuitry can become complex when mounted in multiple locations on a moving actuator. It is difficult to mount sensors with appropriate location precision to allow good measurement of the shafts. The tolerance associated with locating separately each of the encoders in the transmission introduces a significant amount of error in the control circuitry's calculations that use the information of each shaft's position. If not properly calibrated this error can prevent precise positioning and/or locating of the end-effector. Thus, such an arrangement of the sensors requires each of the sensors to be calibrated for the specific transmission that they will be used with.

Thus, there is a need for improving the accuracy of determining the position and/or location of the sensors that detect location of an actuator transmission's input shaft and output shaft. Further, there is a need to simplify the construction of the sensor assembly, and route wiring conveniently through the moving actuator.

SUMMARY

In one aspect of the invention, a transmission includes a housing, a carrier mounted to the housing, an input shaft, an output shaft, an input sensor, and an output sensor. The carrier has a first side that faces in a first direction, and a second side that faces in a direction other than the first direction. The input sensor is mounted to the carrier and disposed on the first side of the carrier. The output sensor is mounted to the same carrier and disposed on the second side of the carrier. The input shaft has a longitudinal axis and is coupled with the housing so that the input shaft can move relative to the housing while the housing holds the input shaft. The output shaft has a longitudinal axis, is coupled with the housing so that the output shaft can move relative to the housing while the housing holds the output shaft, and is coupled with the input shaft such that rotation of the input shaft about its longitudinal axis causes the output shaft to rotate about its longitudinal axis. The input sensor is operable to generate an input signal that represents a position of the input shaft relative to the housing, and the output sensor is operable to generate an output signal that represents a position of the output shaft relative to the housing.

By mounting the carrier to the transmission's housing, and by mounting sensor targets on shafts supported in bearings also referenced to the housing, one can reduce the build-up of radial tolerances for the sensor system as a whole and ensure concentricity as much as possible. Further, by allowing adjustments to the height of the carrier from one sensor target along the longitudinal axis, and by allowing adjustment of the height of the second sensor target along the longitudinal axis, any errors along this axis can readily be adjusted to be within specifications for the sensor, despite wide tolerances in manufacturing of individual components. This, in turn, allows more accurate positional information on the input and output shafts. In addition, the carrier may be mounted to the transmission's housing in such a way that the input and output shafts of the transmission may be concentric, which allows each of the sensors mounted to their respective input and output shafts to rotate about the same, single axis. For robots, the increase in accuracy allows one to determine the position and/or location of an end-effector and appropriately modify the amount of power supplied to a motor of the robot's actuator in order to move or hold the end-effector as desired.

In another aspect of the invention, a transmission includes a housing having a first end and a second end opposite the first end, a carrier mounted to the housing, an input shaft, an output shaft, a passage that extends from the housing's first end to the housing's second end to allow a via through the housing, an input sensor, and an output sensor. The carrier has a first side that faces in a first direction, and a second side that faces in a direction other than the first direction. The input sensor is mounted to the carrier and disposed on the first side of the carrier. The output sensor is mounted to the same carrier and also disposed on the carrier's first side. The input shaft has a longitudinal axis and is coupled with the housing so that the input shaft can move relative to the housing while the housing holds the input shaft. The output shaft has a longitudinal axis, is coupled with the housing so that the output shaft can move relative to the housing while the housing holds the output shaft, and is coupled with the input shaft such that rotation of the input shaft about its longitudinal axis causes the output shaft to rotate about its longitudinal axis. The input sensor is operable to generate an input signal that represents a position of the input shaft relative to the housing, and the output sensor is operable to generate an output signal that represents a position of the output shaft relative to the housing.

For the same reasons discussed above, locating both the input and the output sensors on the same carrier that is itself mounted to the transmission's housing, allows one to obtain more accurate positional information on the input and output shafts. With the passage that extends from the housing's first end to the housing's second end to allow a via through the housing, one can extend wires, cables, hydraulic lines and/or pneumatic lines through the transmission. When the carrier is mounted to the transmission's housing in such a way that the input and output shafts of the transmission are concentric, then the passage may extend through both the input and output shafts. This, in turn, allows one to route wires, cables, hydraulic lines and/or pneumatic lines through the transmission to help protect them and keep them out of the way.

In another aspect of the invention, a method for determining the position of an input shaft and an output shaft of a transmission includes moving an input-target of an input sensor adjacent an input-encoder of the input sensor, the input-encoder being disposed on a first side of a carrier that is mounted to a housing of a transmission, the input-target being mounted to an input shaft of the transmission; and generating, via the input-encoder, an input signal that represents a position of the input shaft relative to the housing. The method also includes moving an output-target of an output sensor adjacent an output encoder of the output sensor, the output-encoder being disposed on a second side of the same carrier that is mounted to the transmission's housing, the second side facing a direction other than the direction that the carrier's first side faces, the output-target being mounted to an output shaft of the transmission; and generating, via the output-encoder, an output signal that represents a position of the output shaft relative to the housing.

In yet another aspect of the invention, a method for determining the position of an input shaft and an output shaft of a transmission includes: 1) moving an input-target of an input sensor adjacent an input-encoder disposed on a first side of a carrier that is mounted to a housing of a transmission, the input-target being mounted to an input shaft of the transmission, the transmission having a first end, a second end opposite the first end, and a passage that extends from the transmission's first end to the transmission's second end to allow a via through the housing; and 2) generating, via the input-encoder, an input signal that represents a position of the input shaft relative to the housing. The method also includes moving an output-target of an output sensor adjacent an output-encoder disposed on the first side of the same carrier that is mounted to the transmission's housing, the output-target being mounted to an output shaft of the transmission; and generating, via the output-encoder, an output signal that represents a position of the output shaft relative to the housing.

BRIEF DESCRIPTION OF THE DRAWINGS

Each of FIGS. 1A and 1B shows a perspective view of an actuator that includes a transmission, according to an embodiment of the invention.

Figure 1A:
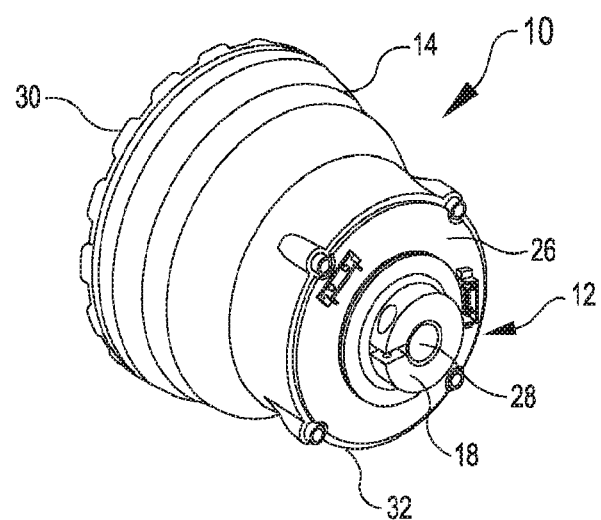
Figure 2:
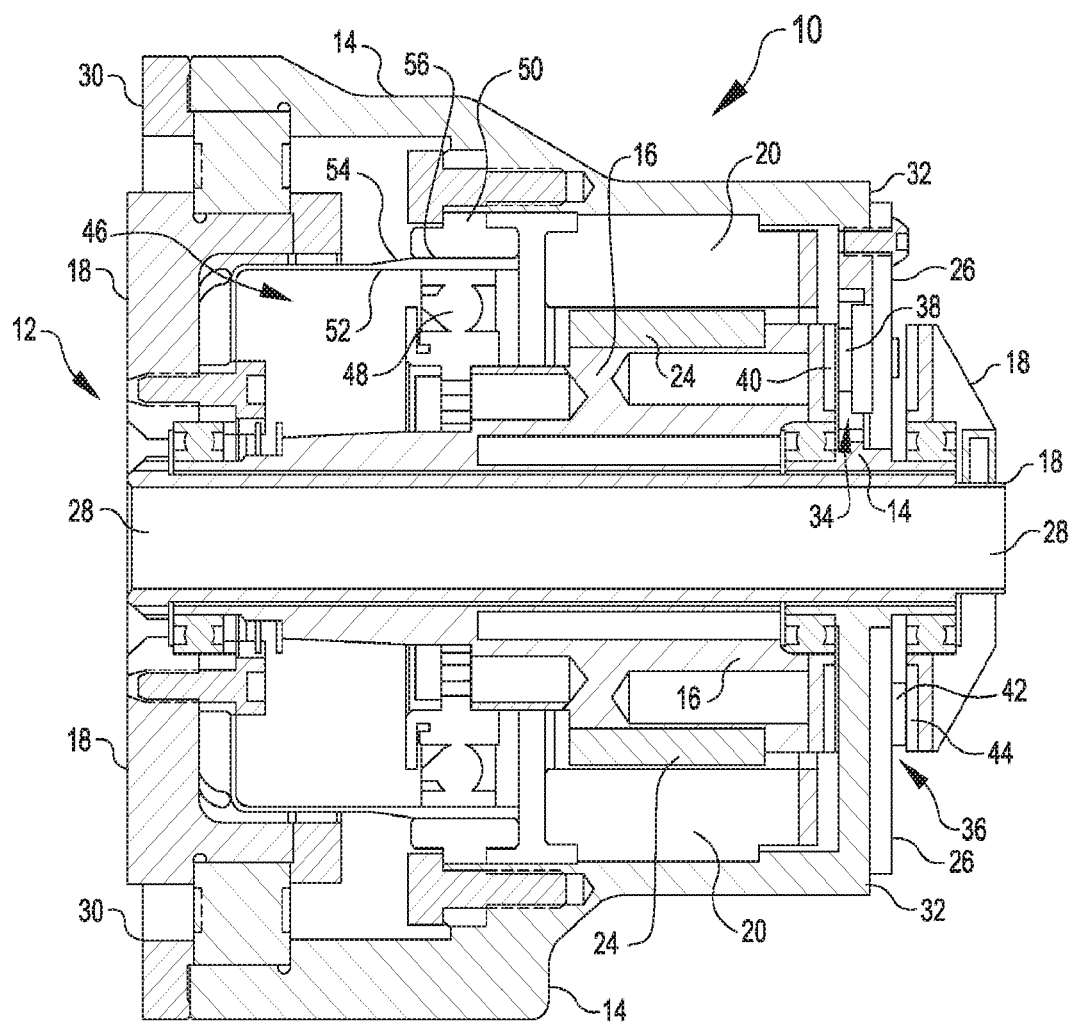
FIG. 2 shows a cross-sectional view of the actuator shown FIGS. 1A and 1B, according to an embodiment of the invention.
Figure 3:
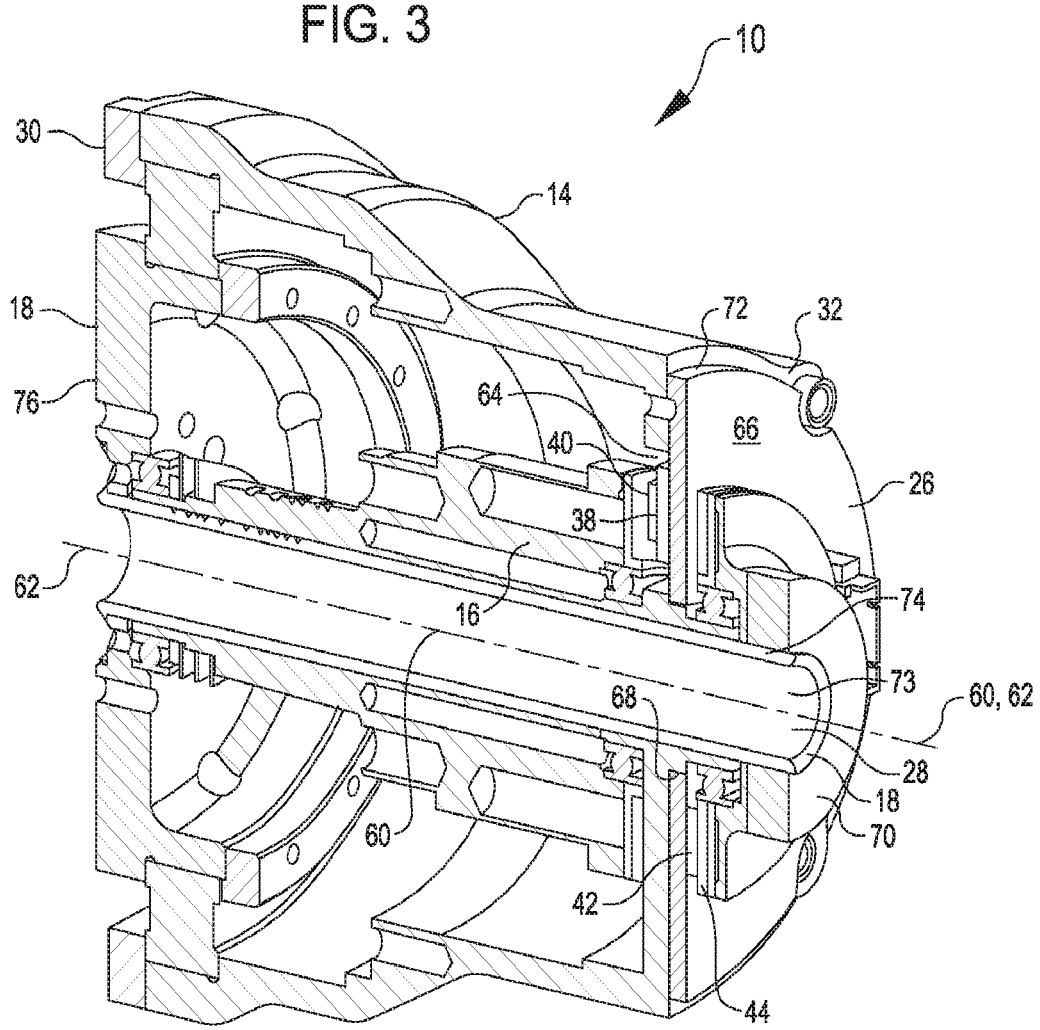
FIG. 3 shows a perspective, cross-sectional view of a portion of the transmission shown in FIGS. 1A-2, according to an embodiment of the invention.
Figure 4A:
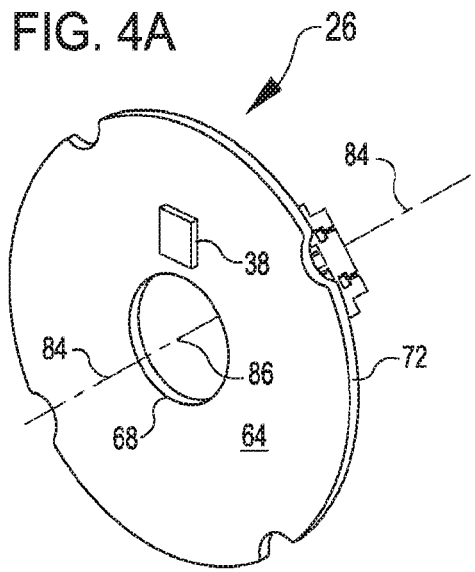
Figure 4B:
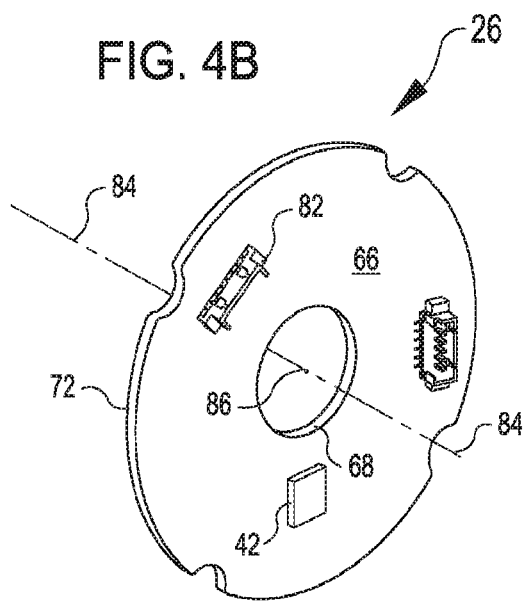

Each of FIGS. 4A and 4B shows a perspective view of a carrier of the transmission shown in FIGS. 1A, 2 and 3, according to an embodiment of the invention.

Figure 5:
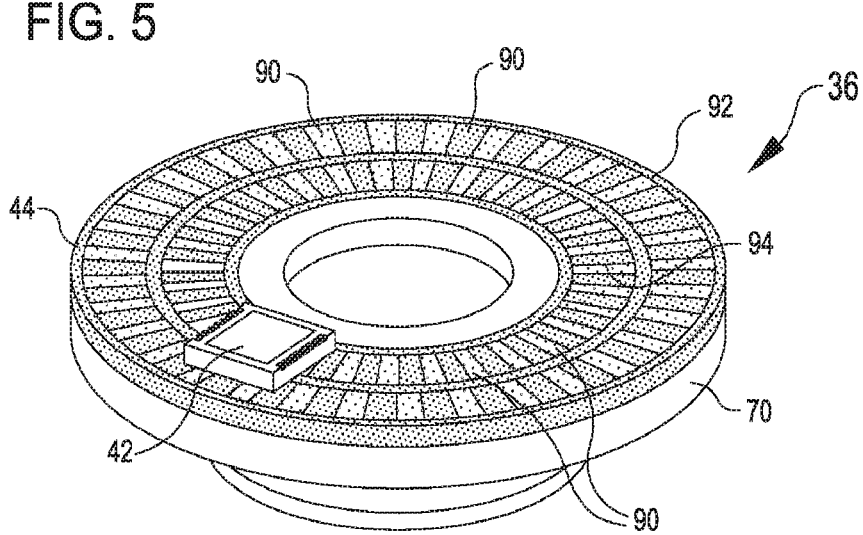

FIG. 5 shows a perspective view of a sensor included in the actuator's transmission shown in FIGS. 1A, 2 and 3, according to an embodiment of the invention.

Figure 6:
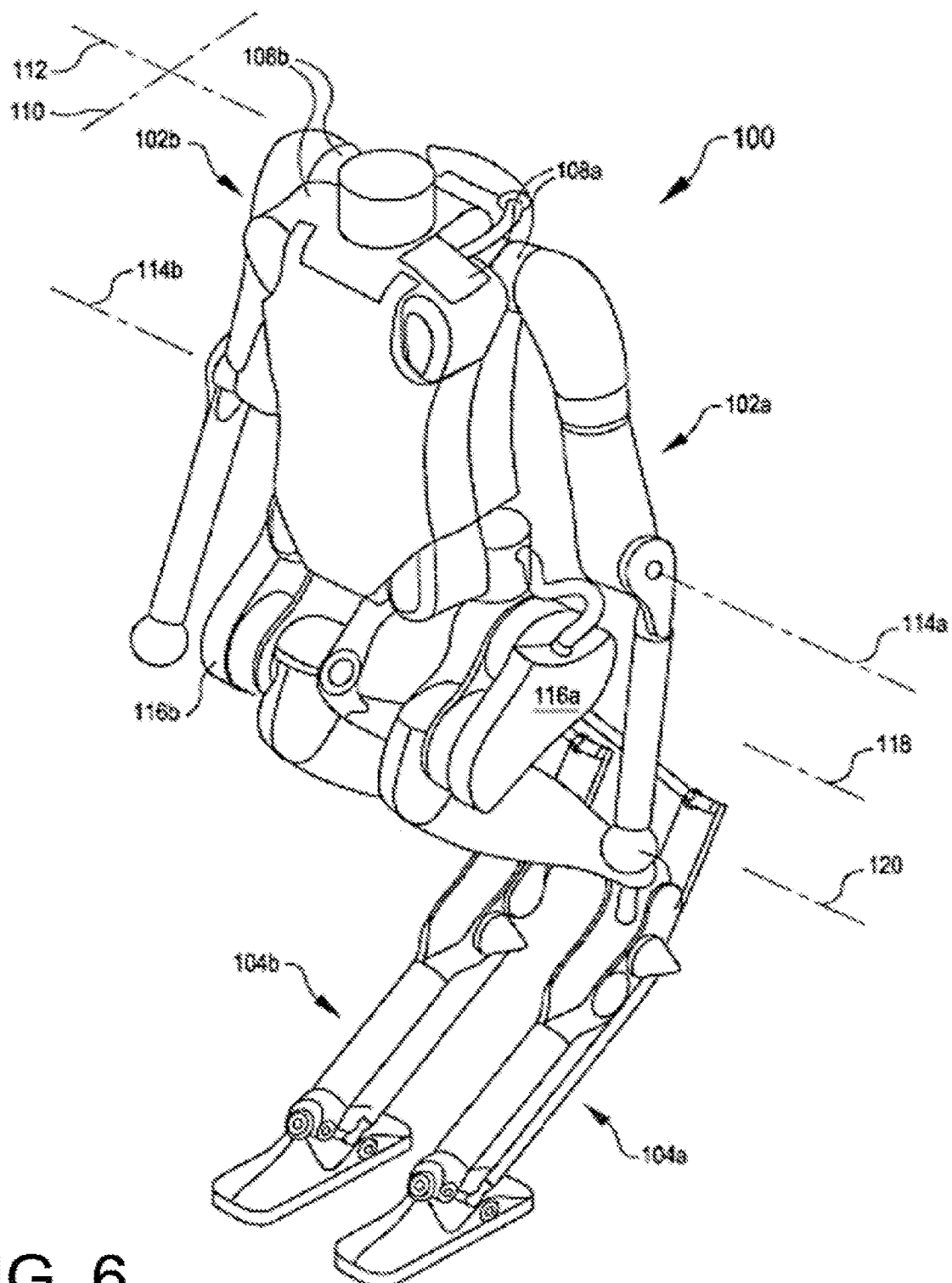

FIG. 6 shows a perspective view of robot that includes the actuator shown in FIGS. 1A-2, according to an embodiment of the invention.

DETAILED DESCRIPTION

Figure 1B:
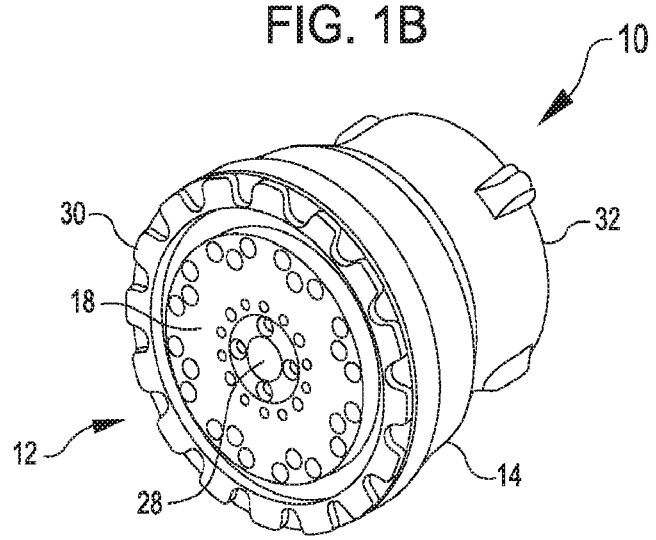

Each of FIGS. 1A and 1B shows a perspective view of an actuator 10, and FIG. 2 shows a cross-sectional view of the actuator 10 shown in FIGS. 1A and 1B, each according to an embodiment of the invention. The actuator 10 may be used in a robot, such as that show in FIG. 6, to position and/or locate as desired an extremity, such as an arm, leg, or boom, or an end-effector such as a hand, finger, or drill. The actuator 10 includes a transmission 12 that has a housing 14, an input shaft 16 (in FIG. 2), and an output shaft 18 coupled with the input shaft 16 such that rotation of the input shaft 16 causes the output shaft 18 to rotate. The actuator 10 also includes a motor 20 (in FIG. 2) that is mounted inside the housing 14 and coupled directly to the input shaft 16. The housing 14 is mountable to or integrated with another component (not shown) of a robot, such as a chassis or body. When the motor 20 is powered, the motor's rotor 24 rotates. This causes the transmission's input shaft 16 to rotate, which, in turn, causes the transmission's output shaft 18 to rotate.

The transmission 12 also includes a carrier 26 mounted to the housing 14, a passage 28 that extends from the housing's first end 30 to the housing's second end 32 to allow a via through the housing 14, an input sensor 34, and an output sensor 36. The input sensor 34 includes an encoder 38 mounted to the carrier 26, and a target 40 mounted to the input shaft 16. As the input shaft 16 rotates, the input sensor 36 generates an input signal that may be used to determine different positions of the input shaft 16 relative to the housing 14 at different moments during the input shaft's rotation. The output sensor 36 includes an encoder 42 mounted to the same carrier 26, and a target 44 mounted to the output shaft 18. As the output shaft 18 rotates, the output sensor 36 generates an output signal that may be used to determine different positions of the output shaft 18 relative to the housing 14 at different moments during the output shaft's rotation.

By mounting the carrier 26 to the transmission's housing 14, and by mounting sensor targets 40 and 44 on shafts supported in bearings also referenced to the housing 14, one can reduce the build-up of radial tolerances for the sensors 34 and 36 as a whole and ensure concentricity as much as possible. Further, by allowing adjustments to the height of the carrier 26 from one sensor target 40 along the longitudinal axis, and by allowing adjustment of the height of the second sensor target 44 along the longitudinal axis, any errors along this axis can readily be adjusted to be within specifications for the sensors 34 and 36, despite wide tolerances in manufacturing of individual components. This, in turn, allows more accurate positional information on the input and output shafts 16 and 18, respectively. In addition and as discussed in more detail in conjunction with FIG. 3, the carrier 26 may be mounted to the transmission's housing 14 in such a way that the input and output shafts 16 and 18, respectively, of the transmission 12 may be concentric, which allows each of the sensor targets 40 and 44 mounted to their respective input and output shafts 16 and 18 to rotate about the same, single axis. For robots, the increase in accuracy allows one to determine the position and/or location of an end-effector and appropriately modify the amount of power supplied to the motor 20 of the robot's actuator 10 in order to move or hold the end-effector as desired.

With the passage 28 extending from the housing's first end 30 to the housing's second end 32 to allow a via through the housing 14, one can extend wires, cables, hydraulic lines and/or pneumatic lines through the transmission 12. When the carrier 26 is mounted to the transmission's housing 14 in such a way that the input and output shafts 16 and 18, respectively, of the transmission 12 are concentric, then the passage may extend through both the input and output shafts 16 and 18, respectively. This, in turn, allows one to route wires, cables, hydraulic lines and/or pneumatic lines through the transmission 12 and actuator 10 to help protect them and keep them out of the way.

Still referring to FIG. 2, the transmission's output shaft 18 may be coupled with the input shaft 16 in any desired manner to provide any desired motion and/or power to the output shaft 18, and thus an end effector of a robot. For example, in this and other embodiments, a strain wave gear 46 couples the input shaft 16 with output shaft 18. More specifically, the input shaft 16 includes a wave generator 48, and a circular spline 50; and the output shaft 18 includes a flex-spline 52. The flex-spline 52 includes a skirt 54 that is flexible and has teeth 56 disposed between the circular spline 50 and the wave generator 48 that are configured to engage and mesh with teeth of the circular spline 50. The flex-spline 52 has fewer teeth 56 that the circular spline 50. When the wave generator 48 rotates it deforms the skirt 54 into a rotating ellipse in which the teeth that are the farthest from the center of the ellipse engage the circular spline's teeth while the other teeth of the flex-spline do not. As this occurs, the flex-spline 52 rotates at a different speed than the wave generator 48, and thus causes the output shaft 18 to rotate at the same, different speed. Because of this configuration, there is very little backlash between the rotation of the transmission's input shaft 16 and the rotation of the transmission's output shaft 18, which helps allow very accurate positional information on the input and output shafts 16 and 18, respectively.

Other embodiments are possible. For example, the input and output shafts 16 and 18, respectively, may be coupled with each other via a chain or belt. For another example, the input and output shafts 16 and 18, respectively may be coupled with each other via a spur and/or worm gear.

Still referring to FIG. 2, the actuator 10 may include any motor 20 as desired. For example, in this and other embodiments the motor is an electric motor that converts direct current into rotational motion. In other embodiments, the motor may be a hydraulic motor that converts hydraulic fluid pressure into rotational motion. In still other embodiments, the motor may convert electricity or hydraulic oil pressure into translational motion.

FIG. 3 shows a perspective, cross-sectional view of a portion of the transmission 12 shown in FIGS. 1A-2, according to an embodiment of the invention. The carrier 26 may be configured and mounted to the transmission's housing 14 in such a way that the input and output shafts 16 and 18, respectively, of the transmission 12 may be positioned concentric to each other to allow each of the sensor targets 40 and 44 mounted to their respective input and output shafts 16 and 18 to rotate about the same, single axis.

For example, in this and other embodiments, the input shaft 16 includes a longitudinal axis 60, and rotates about this axis 60 when the motor's rotor (not shown here) causes the input shaft 16 to rotate. The output shaft 18 includes a longitudinal axis 62, and rotates about this axis 62 when the input shaft 16 causes the output shaft 18 to rotate. And, the carrier 26 includes a first side 64, a second side 66, and a hole 68 through which the output shaft 18 extends. The carrier 26 is mounted to the second end 32 of the housing 14 such that the first side 64 lies adjacent the region of the input shaft 16 that is coupled with the motor's rotor. The input sensor's target 40 is mounted to this region of the input shaft 16, and the input sensor's encoder 38 is mounted to the carrier's first side 64. The output sensor's target 44 is mounted to a body 70 that is attached to the region of the output shaft 18 that extends through the carrier's hole 68, and the output sensor's encoder 42 is mounted on the carrier's second side 66.

In this configuration the input and output shafts 16 and 18, respectively may be arranged such that their respective longitudinal axes 60 and 62 are coaxial. This allows the targets 40 and 44 of the input and output sensors, respectively, to rotate about the same axis, and thus reduce the build-up of tolerances for the sensor targets 40 and 44 as a whole. This, in turn, allows more accurate positional information on the input and output shafts 16 and 18, respectively. In this configuration, the input sensor 34 (shown in FIG. 2) and the output sensor 36 (also shown in FIG. 2) may be located the same distance away from the axes 60 and 62 that they rotate about or they may be located different distances away from the axes 60 and 62. This configuration may also allow one to locate, if desired, one of the sensors 34 or 36 at a third side 72 of the carrier 26 that is different than the first side 64 and the second side 66.

The carrier 26 may be mounted to the housing 14 as desired, and the body 70 may be mounted to the output shaft 18 as desired. For example, in this and other embodiments, the carrier 26 and the body 70 are mounted in such a way that one may easily adjust their respective distances from the housing's end 32 and the carrier's second side 66, respectively. More specifically, a shim (not shown) may be configured to be easily inserted between the carrier 26 and the housing's end 32 when an increase in the distance between the input encoder 38 and input target 40 is desired, or to be easily removed when a decrease in this distance is desired. Likewise, another shim (not shown) may be inserted between the input target 40 and the input shaft 16 where the target 40 is mounted to also allow adjustment of the distance between the input target 40 and the input encoder 38. Similarly, the body 70 may include a threaded portion configured to engage a corresponding threaded portion of the output shaft 18. When an increase in the distance between the output encoder 42 and output target 44 is desired, the body 70 may be rotated relative to the output shaft 18. When a decrease in the distance between the output encoder 42 and output target 44 is desired, the body 70 may be rotated in the opposite direction relative to the output shaft 18. In other embodiments, a shim (not shown) sized to provide the correct distance between the output target 44 and the output encoder 42 may be inserted between them to allow one to quickly position the body 70 along the shaft 18 at the correct location. After the body 70 is secured to the location, the shim may be removed.

Still referring to FIG. 3, the passage 28 may be configured and located in the transmission 12 as desired. For example, in this and other embodiments the passage 28 includes a bore 73 through the output shaft 18 that is centered in the output shaft 18. That is, the bore 73 includes a longitudinal axis that is coaxial with the output shaft's longitudinal axis 62. The bore's diameter may be any length that allows enough material in the output shaft 18 to carry the loads that the output shaft 18 will be required to carry. In this and other embodiments, the portion of the output shaft 18 that extends through the input shaft 16 and the carrier 26, is a transfer tube 74 that rotates the body 70, and thus the target 44 of the output sensor, when the load-carrying portion 76 of the output shaft 18 rotates. The transfer tube 74 does not carry any substantial load, so the diameter of the passage's bore 73 may extend across most of the transfer tube's diameter. Because, in this and other embodiments, the transfer tube 74 extends through the input shaft 16 and their respective longitudinal axes are coaxial, the passage's bore 73 is also coaxial with the input shaft's longitudinal axis 60. Thus, the passage 28 provides a via from one end 30 of the transmission 12 to the other end 32, through a region of the transmission 12, and thus actuator 10, that can be easily isolated from the rotation of the input and output shafts 16 and 18, respectively.

Each of FIGS. 4A and 4B shows a perspective view of a carrier 26 of the transmission shown in FIGS. 1A, 2 and 3, according to an embodiment of the invention.

As previously mentioned, the carrier 26 includes the first side 64, the second side 66, the third side 72, and the hole 68. The carrier 26, however, may be further configured as desired. For example, in this and other embodiments, the carrier 26 is a printed circuit board in the shape of a flat disk. To couple the encoders 38 and 42 to control circuitry (not shown) located elsewhere, the carrier 26 includes two connectors 80 and 82, both mounted to the second side 66 of the carrier 26 so that they can be easily accessed. To connect the encoders 38 and 42 with their respective connector 80 and 82, the printed circuit board includes respective circuits (also not shown). In this and other embodiments, the encoders 38 and 42 are located the same distance away from the axis 84 that passes through the carrier's center 86. In other embodiments, the encoders 38 and 42 may be located different distances away from the axis 84. In still other embodiments, both of the encoders 38 and 42 may be located on the same side of the carrier. This could be either the first side 64 or the second side 66. In this configuration, the encoders 38 and 42 would not be located the same distance away from the axis 84.

FIG. 5 shows a perspective view of the output sensor 36 shown in FIGS. 2 and 3, according to an embodiment of the invention. The input sensor 34 is similar to the output sensor 36 and functions the same way as the output sensor 36 does. Thus, this discussion of the output sensor 36 also applies to the input sensor 34.

The output sensor 36 may be any desired sensor capable of generating an output signal, as the output shaft rotates, that represents a position of the output shaft relative to the transmission's housing 14 (FIGS. 1A-3). The position represented by the output signal may be a relative position from the point of power-on, or it may be used to determine an absolute position (0-360 degrees) at all times without requiring any homing procedure during power-on. In this embodiment, the output sensor 36 provides the absolute position of the output shaft, while the input sensor 34 provides the absolute position of the input shaft 16 (FIGS. 2 and 3) only. Circuitry of the robot, either in the carrier 26 or external to that shown here, combines these two signals to provide a high-resolution estimate of the output position, as well as using the input shaft signal for commutation and control of the motor 20 in the actuator 10 (FIGS. 1A-3). The sensor 36 generates the output signal by sensing changes in the electric potentials or voltages across one or more components of the output encoder 42 that are generated by the Hall effect when a series of magnets 90 (only 4 labeled for clarity) move adjacent the encoder. Here, the output target 44 includes two sets or tracks of magnets 90—a master track 92 and a nonius track 94—mounted to the body 70. More specifically, the output sensor 36 is an iC-MU sensor by iC-Haus, a company located in Bondenheim, Germany.

Other embodiments are possible. For example, one or both of the sensors 34 and 36 may include an optical sensor that senses light emitted or reflected from one or more tracks mounted to the body 70.

FIG. 6 shows a perspective view of robot 100 that includes the actuator 10 shown in FIGS. 1A-2, according to an embodiment of the invention. The robot 100 can walk bipedally and navigate well obstacles, such as steps and uneven ground. In this and other embodiments, the robot 100 includes two arms 102a and 102b, two legs 104a and 104b, and a trunk 106 that each of the arms and legs are coupled to. At a respective one of two shoulders 108a and 108b, each of the arms 102a and 102b are coupled to the trunk 106 via two actuators 10 (not shown). In the shoulder 108b, one of the actuators 10 controls the rotation of the arm 102b about the axis 110, and the other actuator 10 controls the rotation of the arm 102b about the axis 112, which is substantially orthogonal to the axis 110. In the shoulder 108a, the actuators 10 control rotation of the arm 102a about similar axes (not shown). In addition, each of the arms 102a and 102b includes another actuator 10 at a respective elbow that controls the rotation of the distal portion of the arm about a respective one of the axes 114a and 114b.

In this and other embodiments, each of the legs 104a and 104b are coupled to the trunk 106 at a respective one of two hips 116a and 116b, via two actuators 10 (also not shown). In the hip 116a, one of the actuators 10 controls the rotation of the leg 104a about the axis 118, and the other actuator 10 controls the rotation of the leg 104a about the axis 120, which is substantially parallel to the axis 118. In the hip 116b, the actuators 10 control the rotation of the leg 104b about similar axes (not shown).

The preceding discussion is presented to enable a person skilled in the art to make and use the invention. Various modifications to the embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein.

What is claimed is:

1. A transmission comprising:
   a housing;
   a carrier adjustably mounted to the housing, the carrier having a first side that faces in a first direction, and a second side that faces in a direction other than the first direction;
   an input shaft having a longitudinal axis and coupled with the housing;
   an output shaft a sharing the longitudinal axis, and coupled with the housing and the input shaft such that rotation of the input shaft about the longitudinal axis also causes the output shaft to rotate about the longitudinal axis;
   an input sensor comprising an input-encoder and an input-target, the input-encoder disposed on the first side of the carrier and the input-target disposed on the input shaft and positioned relative to the input-encoder to cause the input-encoder to generate an input signal as the input-target moves relative to the input-encoder, the input signal representing a position of the input shaft relative to the housing;

an output sensor comprising an output-encoder and an output-target, the output-encoder disposed on the second side of the carrier and the output-target disposed on the output shaft and positioned relative to the output-encoder to cause the output-encoder to generate an output signal as the output-target moves relative to the output-encoder, the output signal representing a position of the output shaft relative to the housing;

wherein the carrier is movable along the longitudinal axis to change a longitudinal distance between the input-target and the input-encoder.

2. The transmission of claim 1 wherein the first and second sides face in opposite directions.

3. The transmission of claim 1 wherein:
the input sensor is operable to generate a first signal that represents an absolute position of the input shaft relative to the housing within a single revolution of the input shaft, and
the output sensor is operable to generate a second signal that represents an absolute position of the output shaft relative to the housing within a single revolution of the output shaft.

4. The transmission of claim 1 wherein: the input-encoder is mounted to the carrier and disposed on the carrier's first side, and the input-target mounted to the input shaft and positioned relative to the input-encoder to cause the input-encoder to generate the input signal as the input-target rotates about the input shafts longitudinal axis; the output-encoder that is mounted to the carrier and disposed on the carrier's second side, and the output-target is mounted to the output shaft and positioned relative to the output-encoder to cause the output-encoder to generate the output signal as the output-target rotates about the output shafts longitudinal axis; and the carrier is adjustably mounted to the transmission's housing such that the distance between at least one of the following: the input-target and the input-encoder, and the output-target and the output-encoder, is adjustable.

5. The transmission of claim 1, further comprising a motor operable to generate power and mounted within the housing, the motor having a rotor coupled with the input shaft such that rotation of the motor's rotor causes the input shaft to rotate about its longitudinal axis.

6. The transmission of claim 1, wherein: the input shaft includes a wave generator, and a circular spline mounted to the housing, and the output shaft includes a flex-spline disposed between the wave generator and the circular spline.

7. A method for accurately determining the position of an input shaft and an output shaft of a transmission, the method comprising:
moving an input-target of an input sensor adjacent an input-encoder of the input sensor, the input-encoder being disposed on a first side of a carrier that is mounted to a housing of a transmission, the input-target being mounted to an input shaft of the transmission;
generating, via the input-encoder, an input signal that represents a position of the input shaft relative to the housing;
moving an output-target of an output sensor adjacent an output-encoder of the output sensor,
the output-encoder being disposed on a second side of the same carrier that is mounted to the transmission's housing, the second side facing a direction other than the direction that the carrier's first side faces, the output-target being mounted to an output shaft of the transmission;
generating, via the output-encoder, an output signal that represents a position of the output shaft relative to the housing; and
adjusting the distance between at least one of the input-target and the input-encoder, and the output-target and the output encoder, before generating the input signal or the output signal.

8. The method of claim 7 wherein the second side faces in a direction that is opposite the direction that the first side faces.

9. The method of claim 7, wherein: generating the input signal includes generating a signal that represents the absolute position of the input shaft relative to the housing within a single revolution of the input shaft, and generating the output signal includes generating a signal that represents the absolute position of the output shaft relative to the housing within a single revolution of the output shaft.

10. The method of claim 7 wherein the step of adjusting the distance includes one or more of (a) moving the carrier relative to the input-target and moving the output-target relative to the carrier.

11. The method of claim 7, further comprising rotating, via a motor mounted within the housing, the input shaft to cause the input-target to rotate adjacent the input encoder, and the output-target to rotate adjacent the output-encoder.

12. The transmission of claim 1, wherein the output-target is disposed on a body attached to the output-shaft, the body being axially adjustable relative to the carrier to change a longitudinal distance between the output-target and the output-encoder.

13. The transmission of claim 1, wherein a shim is placed between the carrier and the housing to increase the longitudinal distance between the input-target and the input-encoder.

14. The transmission of claim 1, wherein an interface between the carrier and the housing is threaded and the carrier is axially adjusted by rotating it about the longitudinal axis, whereby the longitudinal distance between the input-target and the input-encoder is adjusted.

15. A method of correcting for manufacturing tolerances in an actuator to ensure correct input-sensor gaps and output-sensor gaps between encoders and targets, the method comprising:
providing an actuator having at least a housing, a carrier mounted at a first position on the housing, an input shaft, an output shaft, a motor for rotating the input shaft and the output shaft, a transmission coupling the input shaft to the output shaft via a transmission, an input sensor for determining the rotational speed and location of the input shaft, the input sensor having a input-target disposed on the input shaft and an input-encoder disposed on the carrier, and an output sensor for determining the rotational speed and absolute location of the output shaft, the output sensor having an output-target disposed at a second position on a body movably affixed to the output shaft and an output-encoder disposed on the carrier;
adjusting the first position of the carrier in relation to the input-target until the input-sensor gap between the input-encoder and the input-target is in an operational range; and adjusting the second position of the output-target in relation to the carrier until the output-sensor gap between the output-encoder and the output-target is in an operational range.

* * * * *